(12) United States Patent
Braun et al.

(10) Patent No.: US 9,919,728 B2
(45) Date of Patent: Mar. 20, 2018

(54) STEERING COLUMN MADE OF PLASTIC

(71) Applicant: Ford-Werke GmbH, Cologne (DE)

(72) Inventors: Markus Braun, Cologne (DE); Joachim Heidel, Kassel (DE)

(73) Assignee: FORD-WERKE GMBH, Cologne (DE)

( * ) Notice: Subject to any disclaimer, the term of this patent is extended or adjusted under 35 U.S.C. 154(b) by 0 days.

(21) Appl. No.: 15/000,184

(22) Filed: Jan. 19, 2016

(65) Prior Publication Data
US 2016/0207559 A1  Jul. 21, 2016

(30) Foreign Application Priority Data
Jan. 20, 2015 (DE) .................. 10 2015 100 797

(51) Int. Cl.
| | |
|---|---|
| *B62D 1/185* | (2006.01) |
| *B62D 1/19* | (2006.01) |
| *F16C 3/03* | (2006.01) |
| *B62D 1/181* | (2006.01) |
| *F16C 3/02* | (2006.01) |

(Continued)

(52) U.S. Cl.
CPC .............. *B62D 1/192* (2013.01); *B62D 1/181* (2013.01); *B62D 1/185* (2013.01); *F16C 3/026* (2013.01); *B29C 65/64* (2013.01); *B29C 66/1122* (2013.01); *B29C 66/30321* (2013.01); *B29C 66/54* (2013.01); *B29C 66/612* (2013.01); *B29C 66/7392* (2013.01); *B29L 2031/75* (2013.01);
(Continued)

(58) Field of Classification Search
CPC ........ B62D 1/185; B62D 1/192; B62D 1/197; B62D 1/19; B62D 1/20; B62D 1/16; F16C 3/026; F16C 3/03; F16C 2326/24; Y10T 403/4966; F16D 2001/103; B29L 2031/75
USPC ........... 74/492, 493; 280/775, 777; 464/181, 464/162; 403/280, 282
See application file for complete search history.

(56) References Cited

U.S. PATENT DOCUMENTS

| | | | | |
|---|---|---|---|---|
| 725,574 | A * | 4/1903 | Locke ..................... | B60R 25/04 180/287 |
| 3,264,013 | A * | 8/1966 | Alberghini .............. | F16L 47/16 285/22 |

(Continued)

FOREIGN PATENT DOCUMENTS

| | | |
|---|---|---|
| CA | 2 067 580 A1 | 10/1992 |
| DE | 23 47 372 A1 | 3/1975 |

(Continued)

*Primary Examiner* — Keith Frisby
(74) *Attorney, Agent, or Firm* — Thomas | Horstemeyer, LLP

(57) ABSTRACT

A shaft comprises two parts. One of these two parts is tube-shaped, and the other is pushed into the tube-shaped part along a main axis. The two parts are fixed to each other for rotation about the main axis and connected to each other in a gliding way along the main axis, by a spline provided between the two parts. One of the two parts comprises a plurality of elongated teeth which are parallel to the main axis and whose cross-sections decrease from the first part towards the second part. Intermediate spaces between neighboring teeth are at least as broad as the teeth. The other of the two parts, at its circumference facing the first part, is made of plastically deformable plastic material, and a counter-profile into which the teeth engage is pressed in the plastic material by intrusion of the teeth during assembly of the two parts.

16 Claims, 2 Drawing Sheets

(51) Int. Cl.
*F16D 1/10* (2006.01)
*B29L 31/00* (2006.01)
*B29C 65/64* (2006.01)
*B29C 65/00* (2006.01)

(52) U.S. Cl.
CPC ... *F16D 2001/103* (2013.01); *Y10T 403/4966* (2015.01)

(56) References Cited

U.S. PATENT DOCUMENTS

| | | | |
|---|---|---|---|
| 4,451,245 A | 5/1984 | Hornig et al. | |
| 4,465,301 A | 8/1984 | Bongers et al. | |
| 4,663,819 A * | 5/1987 | Traylor | F16C 3/026 29/432 |
| 5,309,620 A | 5/1994 | Shinohara et al. | |
| 5,716,156 A * | 2/1998 | Bayer | F16D 1/072 403/280 |
| 6,048,428 A * | 4/2000 | Millward | F16L 9/121 138/129 |
| 6,405,612 B1 * | 6/2002 | Kinoshita | B62D 1/181 464/158 |
| 6,692,365 B2 * | 2/2004 | Suzuki | F16C 3/026 403/359.6 |
| 2002/0041790 A1 * | 4/2002 | Suzuki | F16L 34/004 403/280 |
| 2006/0134344 A1 * | 6/2006 | Kitahata | B05D 1/04 427/458 |
| 2007/0260324 A1 * | 11/2007 | Joshi | A61F 2/4465 623/23.51 |
| 2008/0314190 A1 * | 12/2008 | Miyawaki | B62D 1/185 74/496 |
| 2010/0014913 A1 * | 1/2010 | Murgatroyd | C22C 47/068 403/359.1 |
| 2011/0034256 A1 | 2/2011 | Tokioka | |
| 2012/0115621 A1 | 5/2012 | Dullenkopf et al. | |
| 2014/0059832 A1 | 3/2014 | Tokioka | |
| 2015/0047456 A1 | 2/2015 | Heitz et al. | |

FOREIGN PATENT DOCUMENTS

| | | |
|---|---|---|
| DE | 3 213 462 A1 | 10/1983 |
| DE | 30 07 896 C2 | 3/1985 |
| DE | 264 894 A1 | 2/1989 |
| DE | 10 2009 038 039 A1 | 2/2011 |
| DE | 10 2010 039 253 A1 | 2/2012 |
| DE | 20 2010 047 747 U1 | 8/2012 |
| DE | 10 2012005434 B3 | 4/2013 |
| EP | 0 053 284 A1 | 6/1982 |
| EP | 0 091 671 B1 | 5/1986 |
| GB | 2 017 566 A | 10/1979 |

* cited by examiner

STEERING COLUMN MADE OF PLASTIC

CROSS REFERENCE TO RELATED APPLICATIONS

This application claims priority to co-pending German Patent Application No. DE 10 2015 100 797.5 entitled "Plastiklenksäule", filed Jan. 20, 2015.

FIELD OF THE INVENTION

The present invention generally relates to a shaft, particularly a steering control shaft of a motor vehicle, comprising a tube-shaped part and a pushed-in part, a spline being provided between these two parts.

BACKGROUND OF THE INVENTION

It is known that steering columns and particularly steering control shafts may be designed in such a way that, in case of a crash of a motor vehicle in which they are mounted, they may be deformed or telescopically pushed together and thus occupy a reduced space so that they do not put the driver at risk during the crash ("safety steering column").

German Patent Application publication DE 32 13 462 A1, corresponding to European Patent EP 0 091 671 B1, describes a safety steering column for motor vehicles which includes a rigid steering column section and a tube shaped steering column section having a lattice structure, both steering column sections being made of fiber reinforced plastic material. The fiber reinforced plastic material may be a glass fiber reinforced epoxy resin. In case of a an impact of a motor vehicle including this steering column on an obstacle, the tube part comprising the lattice structure may be compressed so that the functionality of a safety steering column is provided. Due to an integral construction of the rigid steering column section and the tube shaped steering column section, there is, however, no lengthwise adjustability of this safety steering column.

German Patent Application publication DE 10 2009 038 039 A1, corresponding to US Patent Application US 2012/0115621 A1, describes a shaft, particularly an articulated shaft for the power train of a motor vehicle, and a coupling element which is connected to one end of the shaft, both the shaft and the coupling element at least partially consisting of a fiber reinforced plastic material.

Steering columns which completely or partially consist of plastic material or fiber reinforced plastic material are, for example, described in German Patent DE 10 2012 005 434 B3, corresponding to US 2015/0047456 A1, European Patent Application publication EP 0 053 284 A1, corresponding to U.S. Pat. No. 4,465,301 A, and UK Patent Application publication GB 2 017 566.

Two- or multi-part steering columns and steering control shafts which may be telescopically pushed together are, for example, known from German Patent Application publication DE 10 2010 039 253 A1 and German Patent Application publication DD 264 894 A1.

German Patent Application publication DT 23 47 372 A1 describes a form fit connection between two parts with a spline for transferring torque between the two parts. One of the two parts has a guiding surface and teeth which are hardened at their sides facing the guiding surface and which are made as cutting edges. The second part has a counter surface receiving the guiding surface, a counter profile of the second part being cut by the teeth of the first part when pressing the two parts together. Due to this way of cutting of the counter profile, it exactly matches the creating profile of the teeth. For example, a rigid connection of a hollow gear to the interior of a gear housing is provided, in which the hollow gear is neither movable in circumferential nor axial direction.

Canadian Patent Application publication CA 2 067 580 A1 describes a drive shaft made of fiber reinforced plastic to which a metal fitting is connected. At its outer circumference, the fitting is provided with a spline, whereas the drive shaft, at its inner circumference, has a smooth surface. A film, a foil or a layer is applied between the surfaces of the drive shaft and the spline of the fitting. The film, foil or layer may be made of a metal such as iron, copper, nickel, aluminum, titanium, silver, tin, zinc or of an alleys alloy such as brass, of a resin such as polyester resin, polyamide resin, polyimide resin, polycarbonate resin, other artificial resins and mixtures, or of a fiber reinforced resin such as a glass fiber mat impregnated with resin. Teeth of the spline of the fitting do not cut the counter profile into the inner circumference of the drive shaft but press it into the film, the foil or layer. It follows from the nature of a connection between a fitting and a drive shaft that this connection is fixed both for rotation about a longitudinal axis of the drive shaft and for shifts in the direction of this longitudinal axis.

German Patent DE 30 07 896 C2, corresponding to U.S. Pat. No. 4,451,245 A, describes a connection between a fitting made of metal and a hollowshaft made of fiber reinforced plastic material. The fitting has a spline at its outer circumference, which cuts into an inner wall of the hollow shaft when pushing the hollow shaft onto the fitting.

US Patent Application publication US 2014/0059832 A1 discloses a method of manufacturing an intermediate shaft including an internal shaft having an external spline, a tubular external shaft having on an inner circumference thereof an internal spline, and a resin coating provided on the external spline. A central axis line of an internal shaft manufacturing intermediate product and a central axis line of an external shaft manufacturing intermediate product are aligned with each other, and the intermediate products are held in such a way that the central axis lines thereof can be adjusted in a heating adaption step. In this state, the intermediate products slide relative in an axial direction. In the heating adaption step, a grease or lubricant is interposed between the intermediate products.

US Patent Application publication US 2011/034256 A1 discloses a spline telescopic shaft including an inner shaft having an outer tooth surface, and a cylindrical outer shaft having an inner tooth surface and arranged to fit to the inner shaft slidably in an axial direction of the inner shaft. Either one of the outer tooth surface and the inner tooth surface includes a first resin coating. The other of the outer tooth surface and the inner tooth surface includes a second resin coating. The second resin coating is formed by sliding an intermediate member for manufacturing the inner shaft and an intermediate member for manufacturing the outer shaft in the axial direction to transfer a part of a resin material provided in the intermediate member for manufacturing the shaft including the one tooth surface for forming the first resin coating to the intermediate member for manufacturing the shaft including the other tooth surface.

German Utility Model publication DE 20 2010 017 747 U1 discloses a sliding sleeve for supporting a telescopic steering spindle comprising an inner spindle and an outer spindle which are arranged coaxially and movable with regard to each other and which have a cross-section for torque transfer differing from a circular cross-section. An intermediate space between the inner spindle and the outer spindle receives the sliding sleeve containing a thermoplastic material and having an inner surface and an outer surface. The guiding sleeve may be fixed to the inner or to the outer spindle.

In all known cases in which a counter profile in one part is directly cut by a spline provided in another part, the two parts are rigidly connected to each other, and no relative movability of the two parts is desired in any direction.

There still is the need of a lightweight and torsional rigid shaft comprising two parts which may be easily shifted with regard to each other in a direction of a main axis.

SUMMARY OF THE INVENTION

The present invent on provides a shaft comprising a first part and a second part. One part of the first and the second parts is tube-shaped, and the other part of the first and second parts is pushed into the tube-shaped part in a direction of a main axis, a circumference of the first part facing a circumference of the second part. The first part and the second part are fixed to each other for rotation about the main axis and connected to each other in a gliding way in the direction of the main axis by a spline provided between the first and the second parts, wherein the first part, at its circumference facing the second part, comprises a plurality of elongated teeth which are parallel to the main axis, wherein a cross-section of the teeth decreases from the first part towards the second part, wherein, in circumferential direction around the main axis, intermediate spaces between neighboring teeth are at least as broad as the teeth, and wherein the second part, at its circumference facing the first part, comprises a pressed-in counter profile into which the teeth engage. The second part, at its circumference facing the first part, is made of plastically deformable plastic material, and the counter profile is pressed in the plastic material of the second part by intrusion of the teeth of the first part into the plastic material during assembly of the first and second parts.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
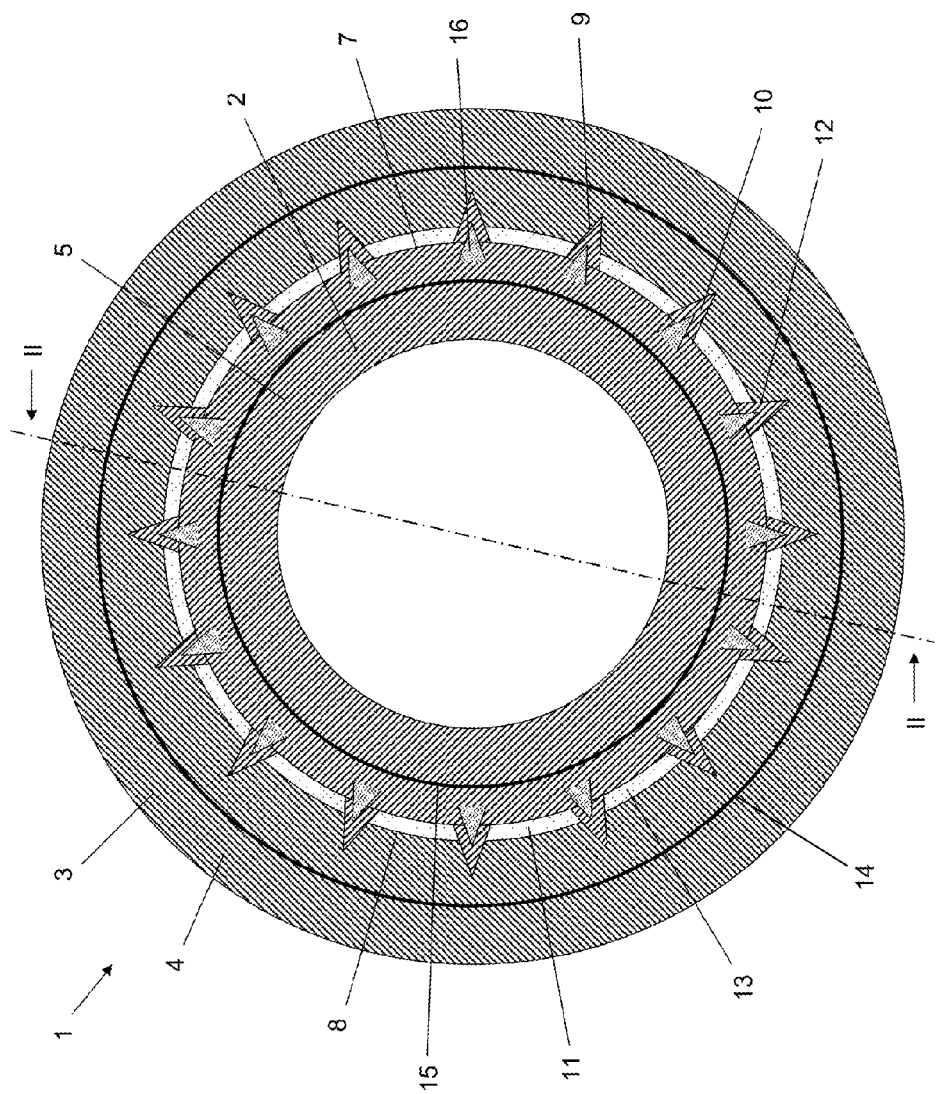
FIG. 1 shows a cross-section through a shaft according to the invention perpendicular to a main axis of the shaft through an area in which a first and a second part of the shaft are overlapping.

The invention relates to a shaft comprising a first part and a second part. One of the first and the second parts is tube-shaped, whereas the other pad may also be tube-shaped or of any other suitable longitudinally extended shape, such as a rod, for example. In a partial area, the two parts are pushed into each other, the other part being pushed into the tube-shaped part. This partial area in which the first and second parts are overlapping is also referred to as the overlapping area, here. Preferably, the pushed-in part is the first part. According to the present invention, however, the pushed-in part may also be the second part.

The two parts have circumferences facing each other; these are the outer circumference of the pushed-in part and the inner circumference of the tube-shaped part. Thus, preferably, these are the outer circumference of the first part and the inner circumference of the second part. However, the circumferences facing each other may also be the outer circumference of the second part and the inner circumference of the first part.

In the overlapping area in which the first part and the second part overlap, a spline is provided via which the first part and the second part are connected fixed for rotation about the main axis of the shaft and in a sliding way in the direction of the main axis. As a component of the spline, the first part, at its circumference facing the second part, has a plurality of elongated teeth which are parallel to the main axis. The cross-sections of these teeth taper from the first part towards the second part. In circumferential direction around the main axis, intermediate spaces between the teeth are at least as broad as the teeth at the base of their cross-sections. The second part, at its circumference facing the first part as described above, comprises a pressed-in counter profile of the spline into which the teeth engage.

According to the invention, the second part, at its circumference facing the first part, is made of a plastically deformable plastic material which allows the teeth being pressed-in; and the counter profile of the spline is formed into the plastically deformable plastic material when assembling the first and the second parts by pressing-in the teeth. By means of its plastic deformability the plastic material does not only allow for the teeth being pressed-in and thus for a simple and low cost formation of the counter profile of the spline. The plastically deformable plastic material also sets a basis for the desired compressibility of the shaft according to the present invention in case of a crash.

To ensure this compressibility, e.g. that the two parts are further pushed into each other instead of buckling, even with a crash of a high momentum, at least one of the first and second parts, in the area of the intermediate spaces, may be coated with a lubricant. The intermediate spaces may partially or completely be filled with the lubricant which ensures that the two parts of the shaft are easily pushed into each other in the direction of the main axis. The lubricant may be applied as a coating to the first part, to the second part, or to both the first and second parts. It is preferred that the second part is coated with the lubricant in the area of the spline, particularly already prior to assembling the first and second parts. Preferably polytetrafluorethylene is selected as the lubricant.

The spline may extend over an arbitrary part of the length of the shaft. Preferably, the spline is provided over the entire overlapping area of the shaft in which the first and second parts overlap, when the pushed-in part is pushed into the tube-shaped part to a maximum extent. Here, it is an option that the counter-profile of the spline is only formed over this entire overlapping area in case of a crash.

The shape of the cross-sections of the teeth may be arbitrarily selected. Preferably, the cross-sections are trapezoid or triangular. Further, it is preferred that the intermediate spaces between neighboring teeth are broader than the teeth at the base of their cross-sections. It is particularly preferred that the intermediate spaces are more than twice as broad as the teeth at the base of their cross-sections.

Generally, the first part and the second part may be made of any suitable equal or different materials. To provide a particularly lightweight shaft which may be manufactured at low cost, at least one of the first and the second parts is preferably made of plastic material by more than 50% by volume or even by weight. Preferably, the two parts are then reinforced over their entire length or at least in the overlapping area in which the two parts overlap, when the pushed-in part is pushed into the tube-shaped part to a maximum extent. The plastic material of at least one of the first and the second parts may be fiber reinforced, particularly by means of glass fibers. The fiber reinforced plastic material may make up a portion of the respective first or second part or the entire part. Alternatively or additionally, the at least one of the first and the second parts may be reinforced by a cylinder jacket-shaped inlay coaxially aligned with the main axis. This inlay may be inlayed at any suitable position of the respective first or second part. Preferably, the inlay is covered by one or more other materials of which the respective part is mainly made at both of its circumferences. It is particularly preferred, that the inlay is essentially located in the middle of an overall thickness or wall thickness of the respective first or second part. The inlay may be made of any suitable material, particularly of a torsional rigid material. Preferably, the inlay is made of steel. The inlay may be designed as a continuous inlay; generally, however, it may have any suitable structure. For example it may completely or partially have a lattice structure. Preferably, the inlay is at least partially designed as a lattice. The lattice design of the inlay saves material of the inlay and thus, as a rule, weight of the shaft. Further, the lattice design of the inlay ensures a particularly good anchoring of the inlay in an enclosing material of the respective part. If this material completely encloses the inlay, the material may provide a corrosion protection for the inlay. The inlay may then, for example, be made of a steel which is not corrosion-resistant itself.

Alternatively or additionally, the reinforcement may also be realized as an outer reinforcement. Such an outer reinforcement may particularly be provided in the overlapping area in which the two parts overlap, when the pushed-in part is pushed into the tube-shaped part to a maximum extent. The outer reinforcement may particularly be real zed by thickening (increasing the wall thickness) of the tube-shaped part. Such a thickening of the tube-shaped part may be integrally made of the material of the respective part, or it may consist of an additional reinforcement element force-fitted or friction-fitted to the tube-shaped part. The separate reinforcement may, for example, be a tube pushed on or a tape wound around the tube-shaped part. Generally, even a separate reinforcement element may be of the same material as the tube-shaped part. It may, however, also be made of another material, like, for example, steel or a high strength fiber compound material.

Alternatively or additionally, the teeth may be reinforced. Such a reinforcement may, for example, be provided by coating the tooth surfaces with a hard plastic material. Preferably, the teeth are each reinforced by means of an inner reinforcement. This reinforcement may be made of a same material as the possible tube-shaped inlay in the parts, but also of any other suitable material. For example, the reinforcement may be provided by a hard plastic material arranged within the teeth.

At the ends of the shaft which are facing away from the overlapping area in which the two parts overlap, fittings may be provided. These fittings may have any known suitable form for fittings of shafts and they may be connected to the parts in any suitable known way. For example, the fittings may be made of steel or a particularly durable plastic or ceramic material. Alternatively, the fittings may be integrally formed with the first and second parts, particularly of a glass fiber reinforced plastic material. Particularly, if the fittings are made of a plastic or ceramic material by more than 50%, the fittings may be provided with a reinforcing inlay. The inlay may be made of a same material as the possible inlay of the parts or of any other suitable material. Preferably, the inlay of the fittings is made of steel.

In the shaft according to the invention, the tube-shaped part and the pushed-in part may both have a constant outer or inner diameter, respectively, over the entire length over which the pushed-in part may be pushed into the tube-shaped part, i.e. over the maximum possible overlapping area. With these constant inner and outer diameters, the two parts may be reversibly pushed together and pulled away from each other without radial play developing between the two parts. At its connection end, the tube-shaped part may, however, have a conical area with an inner diameter decreasing towards this connection end to counteract a further intrusion of the other part by means of a higher resistance. This higher resistance may purposefully be used for reducing crash energy, if the shaft is for example used as a shaft between a steering wheel and a steering gear of a motor vehicle. Here, the free end of the pushed-in part which enters into the conical area of the tube-shaped part, may have an outer diameter decreasing in the same direction to build up the crash energy reducing resistance over a particularly large friction surface.

Alternatively or additionally, the other part may also have a conical area with an outer diameter increasing towards its connection end, and this conical area may face a further conical area of the tube-shaped part having an inner diameter increasing in the same direction to also build up a resistance here which counteracts further pushing together the two parts and which may be used for a further reduction of crash energy.

If reduction of crash energy is the only purpose, the tube-shaped part and the engaging other part may also be conical over their entire length. Then, the shaft is, however, only variable in length once upon pushing the other part into the tube-shaped part. If the two parts are pulled away from each other again, a radial play will occur Referring now in greater detail to the drawings. FIG. 1 is a cross-section through a shaft 1 according to the invention along an intersection line I-I in FIG. 2, and shows a first part 2 and a second part 3 of the shaft 1. One part 4 of the first part 2 and the second part 3 is tube-shaped, and the other part 5 of the first part 2 and the second part 3 is pushed into the tube-shaped part 4. In the example depicted in FIG. 1, the tube-shaped part 4 is the second part 3, and the pushed-in part 5 is the first part 2. The invention, however, is not restricted to this embodiment: The tube-shaped part 4 may also be the first part 2 and the pushed-in part 5 may correspondingly be the second part 3. In any case, the pushed-in part 5 may be tube-shaped or rod-shaped.

A spline 9 is formed between the first part 2 and the second part 3. The first part 2 comprises a plurality of teeth 10 at its one circumference, which are elongated along and parallel to a main axis 6 of the shaft 1. The spline 9 may extend over an arbitrarily selected portion of the shaft 1. Preferably, it extends over an overlapping area in which the first part 2 and the second part 3, in use of the shaft 1, are overlapping and moved with regard to each other. It is particularly preferred when the spline 9 extends over the entire overlapping area in which the two parts 2, 3 or 4, 5 overlap, when the pushed-in part 5 is pushed into the tube-shaped part 4 to a maximum extent.

Cross-sections of the teeth 10 decrease in width from the first part 2 towards the second part 3. For example, the cross-sections of the teeth 10 may be trapezoid, preferably the cross-sections are triangular. In circumferential direction around the main axis 6, the teeth 10 are separated by intermediate spaces 11. The bases of this these intermediate spaces are at least as broad as the bases of the teeth 10. Preferably, the intermediate spaces at their bases are at least twice as broad as the teeth 10 at their bases.

In the embodiment depicted in FIG. 1, the circumference 7 of the first part 2 at which the teeth 10 are arranged is the outer circumference of the pushed-in part 5. If, however, the first part 2 is the outer tube-shaped part 4, the circumference 7, at which the teeth 10 are arranged, is the inner circumference of the first part 2. A circumference 8 of the second part 2 is facing the circumference 7. If the second part 3, like in case of FIG. 1, is the tube-shaped part 4, the circumference 8 is the inner circumference of the tube-shaped part 4. If, however, the second part 3 is the pushed-in part 5, the circumference 8 is the outer circumference of the second part 3.

In the embodiment of FIG. 1, the second part 3 comprises a pressed-in counter profile 12 at its circumference 8, into which the teeth 10 engage. Upon assembling the parts, the counter profile 12 is formed into the material of the second part 3 at its circumference 8 by intrusion of the teeth into the material. For this purpose, the second part 3, at its circumference 8, is made of a plastically deformable synthetic or plastic material into which the teeth 10 may intrude. In the area of the intermediate spaces 11, the circumference 7 of the first part 2 and the circumference 8 of the second part 3 are arranged at a small distance. In this area of the intermediate spaces 11, a lubricant 13 is provided. The lubricant 13 may be provided as a coating of the first part 2 or as a coating of the second part 3 or as coatings of both parts 2 and 3. Preferably, the lubricant 13 is provided as a coating of the second part 3. The lubricant 13 may be any viscous or solid substance suitable as the lubricant; polytetrafluoroethylene is preferred as the lubricant 13.

The tube-shaped part 4 and the pushed-in part 5 may each comprise a cylinder jacket-shaped inlay 14, 15. The inlays 14, 15 provide a reinforcement for the respective part 2, 3. Such a reinforcement may also be provided in another suitable way or of any other suitable construction, for example in that the material of the parts 2, 3 is reinforced by means of added substances or particles. Preferably, the parts 2, 3 are made of plastic material which, for example, may be reinforced with glass fibers. Generally, however, the parts 2, 3 may be made of any suitable material. The inlays 14, 15 may also be made of any suitable material, like for example of a torsional rigid plastic. Preferably, they are made of steel. The inlays 14, 15 may be continuous over the length of the respective part 2, 3. Preferably, however, they are completely or partially made as a mesh or lattice. The teeth 10 also comprise a reinforcement 16. This reinforcement may be provided in different ways; for example, the teeth 10 may be coated at their outside. Preferably, the reinforcement 16, however, reinforces the teeth 10 in their interior. The reinforcement 16 may consist of the same material as the inlays 14, 15 or of any other suitable material.

Figure 2:
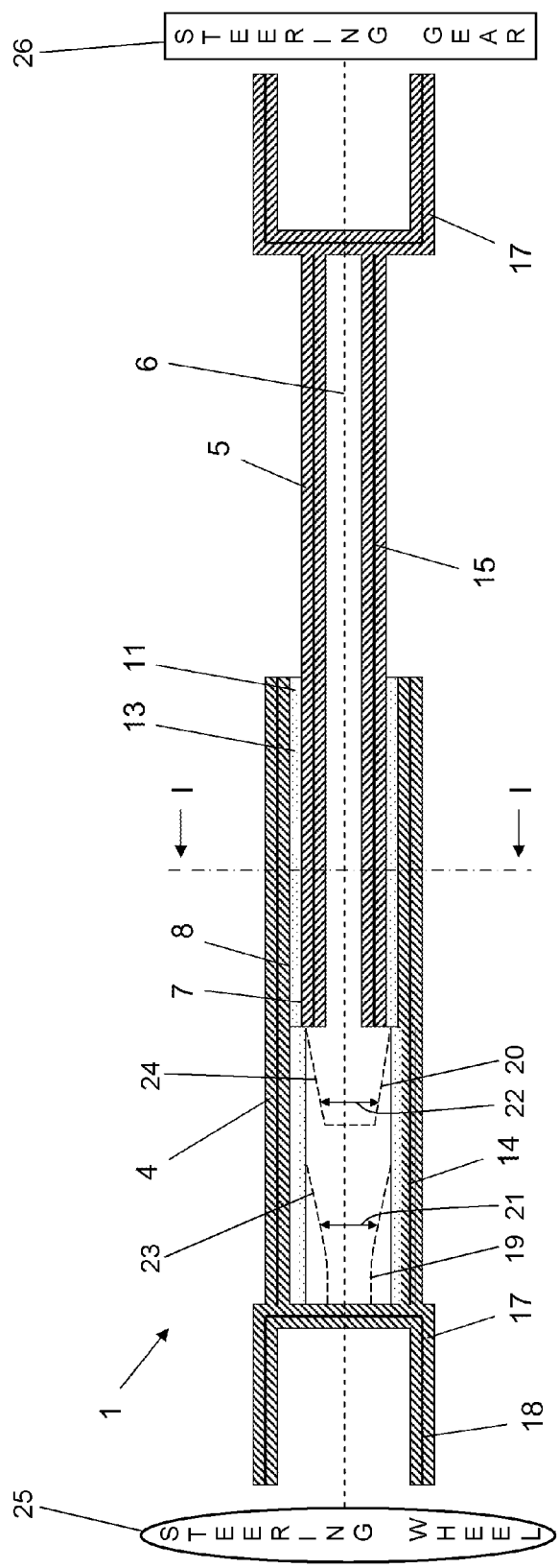
FIG. 2 shows a longitudinal section through the shaft of FIG. 1 along its main axis.

FIG. 2 shows a cross-section through the shaft 1 according to the invention in a direction along its longitudinal axis 6 and thus along a section line II-II in FIG. 1. In the operational position of the shaft 1 depicted here, the first part 2 is pushed into the second part 3, which is the tube-shaped part 4, up to a maximum extent. In the overlapping area of the two parts 2, 3, the intermediate spaces 11 are filled with the lubricant 13.

Fittings 17 of the two parts 2, 3 are provided at ends of the shaft 1 facing away from the overlapping area of the two parts 2, 3. The fittings 17 may be integral with the parts 2, 3 or 4, 5, or they may be connected to the parts with form fit and/or force fit. The fittings 17 are made of any suitable stiff and durable material, like for example fiber reinforced plastic, pressure diecast steel, forged steel or ceramics. Preferably, the fittings 17 are made of fiber reinforced plastic integrally with the parts 4, 5. Like the parts 4, 5 the fittings 17 may each comprise a reinforcing inlay 18. With an integral formation of the parts 4, 5 and the fittings 17, the inlays 18 are preferably made of the same material as the inlays 14, 15. It is particularly preferred that they are made of steel.

In FIG. 2 dashed lines 19 and 20 indicate that the inner diameter 21 of the tube-shaped part 4 and the outer diameter 22 of the pushed-in part 5, at the ends of the two parts 4, 5 pointing towards the fitting 17 of the tube-shaped part 4 are tapering towards this fitting 17 of the tube-shaped part 4 so that the tube-shaped part 4 has an inner conical area 23 followed by a further area with a smaller constant inner diameter 21, and the other part 15 ends with a corresponding outer conical area 24. When the pushed-in part 5 is pushed into the tube-shaped part 4 to such an extent that the outer conical area 24 abuts against the inner conical area 23, further pushing-in is only possible by overcoming a considerable resistance, i.e. the deformation resistance of the parts 4 and 5. This effect may be purposefully used to reduce crash energy in the direction of the main axis 6, if the shaft 1 is, for example, arranged between a steering wheel 25 and a steering gear housing 26 of a motor vehicle and when the motor vehicle is involved in an accident. Areas at the other ends of the two parts 4, 5 may be provided with inner and outer diameters increasing towards the fitting 17 of the other part 5. These areas may also be used for reducing crash energy. It will be understood that any reduction of crash energy in this way will result in an irreversible deformation of the parts 4 and 5.

Many variations and modifications may be made to the preferred embodiments of the invention without departing substantially from the spirit and principles of the invention. All such modifications and variations are intended to be included herein within the scope of the present invention, as defined by the following claims.

We claim:

1. A shaft comprising a first part and a second part,
wherein a steering wheel is fixed for rotation to one of the first and second parts,
wherein one part of the first and the second parts is tube-shaped, and the other part of the first and second parts is pushed into the tube-shaped part in a direction of a main axis, a circumference of the first part facing a circumference of the second part,
wherein the first and the second parts are fixed to each other for rotation about the main axis and connected to each other in the direction of the main axis by a spline provided between the first and the second parts,
wherein the first part, at its circumference facing the second part, comprises a plurality of elongated teeth which are parallel to the main axis,
wherein cross-sections of the teeth decrease from the first part towards the second part, wherein, in circumferential direction around the main axis, intermediate spaces between neighboring teeth are at least as broad as the teeth, and wherein the second part, at its circumference facing the first part, comprises a pressed-in counter profile into which the teeth engage, wherein the second part, at its circumference facing the first part, is made of plastically deformable plastic material, and wherein the counter profile is pressed in the plastic material of the second part by intrusion of the teeth of the first part into the plastic material during assembly of the first and second parts, wherein the first and second parts overlap in an overlapping area in which the tube-shaped part of the first and the second parts has a constant inner diameter and the other part of the first and the second parts has a constant outer diameter, wherein, in the intermediate spaces, at least one of the first and second parts is coated with a lubricant, wherein the other part of the first and second parts is reversibly pushable into the tube-shaped part over the overlapping area and pullable away from the tube-shaped part without radial play developing between the first and second parts, and wherein the tube-shaped part of the first and the second parts, at its end facing away from the overlapping area, has a conical area with an inner diameter decreasing in a direction away from the overlapping area, and wherein the other part of the first and the second parts, at its free end which enters into the conical area of the tube-shaped part of the first and the second parts has an outer diameter decreasing in the direction away from the overlapping area.

2. The shaft of claim 1, wherein the lubricant is polytetrafluoroethylene.

3. The shaft of claim 1, wherein at least one of the first and second parts is made of plastic material by more than 50% by volume or by weight.

4. The shaft of claim 1, wherein, at least in an overlapping area, at least one of the first and second parts is reinforced.

5. The shaft of claim 4, wherein the at least one of the first and second parts is reinforced by a cylinder jacket-shaped inlay coaxially aligned with the main axis.

6. The shaft of claim 5, wherein the cylinder jacket-shaped inlay is made of steel and at least partially made as a lattice.

7. The shaft of claim 1, wherein at least one of the first and second parts is made of fiber reinforced plastic material.

8. The shaft of claim 1, wherein the tube-shaped part is reinforced by a reinforcement.

9. The shaft of claim 1, wherein the teeth are reinforced.

10. The shaft of claim 9, wherein each of the teeth includes an inner reinforcement.

11. The shaft of claim 1, wherein each of the teeth has a triangular or trapezoid cross-section.

12. The shaft of claim 1, wherein the intermediate spaces are at least twice as broad as the teeth.

13. The shaft of claim 1, wherein fittings provided at ends of the shaft facing away from the overlapping area, are integrally constructed with the first and second parts of the shaft, respectively.

14. The shaft of claim 13, wherein each of the fittings is reinforced by an inlay.

15. The shaft of claim 14, wherein the inlay is made of steel.

16. The shaft of claim 1, wherein the overlapping area is part of a steering wheel side portion of a steering column of a motor vehicle including the shaft.

* * * * *